(12) United States Patent
Olafsson et al.

(10) Patent No.: US 6,317,419 B1
(45) Date of Patent: Nov. 13, 2001

(54) METHOD AND APPARATUS FOR TRAINING AN ECHO CANCELER IN A PCM MODEM CONTEXT

(75) Inventors: Sverrir Olafsson, Reykjavik (IS); Zhenyu Zhou, Irvine, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/095,689

(22) Filed: Jun. 10, 1998

(51) Int. Cl.[7] .................................................. H04B 3/20
(52) U.S. Cl. ................................. 370/292; 370/286
(58) Field of Search .................................. 370/286, 292, 370/352, 287; 375/341

(56) References Cited

U.S. PATENT DOCUMENTS

| | | | |
|---|---|---|---|
| 4,571,720 | * 2/1986 | Chevreau et al. | 370/292 |
| 4,780,883 | 10/1988 | O'Connor et al. | |
| 4,970,715 | * 11/1990 | McMahan | 370/287 |
| 4,977,591 | * 12/1990 | Chen et al. | 370/292 |
| 4,987,569 | * 1/1991 | Ling et al. | 370/292 |
| 5,329,586 | 7/1994 | Agazzi. | |
| 5,761,247 | 6/1998 | Betts et al. | |
| 5,764,699 | 6/1998 | Needham et al. | |
| 5,889,823 | * 5/1999 | Agazzi et al. | 375/341 |
| 5,909,426 | * 6/1999 | Liau et al. | 370/292 |
| 5,982,768 | * 11/1999 | Bellenger et al. | 370/352 |
| 6,058,110 | * 5/2000 | Bellenger et al. | 370/352 |

FOREIGN PATENT DOCUMENTS

| | | |
|---|---|---|
| 0 708 537 A1 | 2/1995 | (EP). |
| WO 98/08310 | 5/1997 | (WO). |
| WO 98/17044 | 10/1997 | (WO). |
| WO 99/37051 | 1/1998 | (WO). |

* cited by examiner

*Primary Examiner*—Salvatore Cangialosi
(74) *Attorney, Agent, or Firm*—Farjami & Farjami LLP

(57) ABSTRACT

An improved echo canceler training technique may be employed by a digital server modem in a PCM modem context, such as a V.90 modem system. The disclosed echo canceler training technique establishes the digital impairments within the echo path by transmitting a training signal from a transmitter located at the digital server modem. The echo signal generated in response to the training signal is received by the digital server modem and appropriately analyzed to accurately model the echo path. The echo canceler resident at the server modem is than suitably trained to compensate for the modeled echo path. In the preferred embodiment, the echo canceler training signal is also used during in the context of downstream digital impairment learning by the analog client modem. In the context of the echo canceler training, the server modem does not rely upon any processing or analysis performed by the client modem; the server modem trains its echo canceler without receiving any information from the client modem.

20 Claims, 3 Drawing Sheets

METHOD AND APPARATUS FOR TRAINING AN ECHO CANCELER IN A PCM MODEM CONTEXT

FIELD OF THE INVENTION

The present invention relates generally to echo cancellation techniques in a digital communication system. More particularly, the present invention relates to an echo canceler training scheme that contemplates the presence of digital impairments or other memoryless nonlinearities within the echo channel.

BACKGROUND OF THE INVENTION 56 kbps modems are very soon to be standardized in accordance with the V.90 modem recommendation. V.90 modems employ pulse code modulation (PCM) techniques and take advantage of the digital nature of the public switched telephone network (PSTN) to obtain a higher data rate in the downstream direction, i.e., from a server modem to a client modem. FIG. 1 depicts a conceptual diagram of a typical 56 kbps communication path using current PCM modem technology. A central site, such as an internet service provider (ISP) 100, is digitally connected to a telephone network 130 through a transmitter 110 and a receiver 120 resident at an ISP modem 105. The network 130 is connected to a local loop 150 through a central office line card 140. The line card typically has a PCM codec implemented therein. The local loop 150 is connected to the user's personal computer (PC) 170 at the user's site through the user's modem 160. As can be appreciated by those skilled in the art, the connection between the ISP modem transmitter 110 to the telephone network 130 is a digital connection that supports a typical data rate of about 64 kbps. Since the parameters of the telephone network 130 and line card 140 are dictated and set by the operating specifications of the network (and particularly the use of the $\mu$-law or A-law signal point constellations), the central site transmitter 110 is configured to transmit the digital data in a particular way to fully exploit its digital connection to the network.

FIG. 2 illustrates a portion of a digital server modem 200, which includes a transmitter 202 and a receiver 204. As with many practical data communication systems, near-end echo (represented by an echo path 206) associated with a transmit signal may be present in a signal received by server modem 200. The characteristics of the near-end echo signal may be dictated by functional components in the upstream and downstream channels and/or processing performed within the telephone network. The echo signal combines with the intended receive signal and the "corrupted" receive signal is then processed by server modem 200. An echo canceler 208 is employed by server modem 200 to compensate for the near end echo. In an ideal modem system, a duplicate echo signal generated by echo canceler 208 is subtracted from the signal received by server modem 200.

In V.90 modems, the presence of digital impairments in echo path 206 complicates the echo cancellation process. These digital impairments, such as robbed bit signaling (RBS) and digital pads, are nonlinear in nature and usually memoryless; conventional echo cancellation techniques for modeling the overall echo path using a linear time invariant (LTI) filter may not provide optimal results. Instead, the echo path 206 can be effectively modeled as a nonlinear memoryless mapping, an LTI filter, and another nonlinear memoryless mapping. Furthermore, current echo cancellation techniques for V.90 server modems have several shortcomings. One proposed solution utilizes a probing signal that is transmitted by digital server modem 200 and received by the analog client modem. The client modem detects and analyzes the downstream digital impairments and sends information back to server modem 200. The information is utilized by echo canceler 208 to establish and model the characteristics of the downstream digital impairments in addition to analog aspects of echo path 206. This technique is undesirable because server modem 200 must rely upon the detection and analytical capabilities of the client modem. Performance errors caused by the client modem can adversely affect the server modem echo cancellation procedure and can adversely affect the ultimate resolution of the receive signal.

Furthermore, the current scheme for sending back the mapping information from the analog client modem to the digital server modem 200 assumes that the digital impairment source always maps one PCM level to another PCM level. This assumption may not be valid for some situations. In addition, the above proposed scheme only analyzes the downstream characteristics of echo path 206. The client modem has no way to directly determine those aspects of echo path 206 that are associated with any upstream digital impairment features of the modem system. Although server modem 200 may be configured to estimate such upstream digital impairment features in echo path 206, an adaptive and direct measurement of echo path 206 may be more robust and reliable.

Finally, the accuracy of this proposed echo cancellation technique may not be optimal. Due to elements in the downstream path over which the probing signal must travel, the amount of noise in the probing signal may exceed desirable levels. Excessive noise levels or nonlinearities present in the downstream channel (which may not necessarily exist in echo path 206) can corrupt the determination of the downstream digital impairment characteristics and can lead to inaccurate echo cancellation.

SUMMARY OF THE INVENTION

Accordingly, it is an advantage of the present invention that an improved echo cancellation technique suitable for V.90 server modems is provided.

Another advantage of the present invention is that it provides an echo canceler training technique that is dedicated to the server modem such that information from the client modem is unnecessary.

Another advantage is that the present invention can employ an echo canceler training procedure that utilizes a line probing signal which also serves as a downstream digital impairment learning signal.

A further advantage is that the present invention may be configured to compensate for digital impairments and other nonlinear distortions that may be present in the near-end echo path.

Another advantage is that the preferred echo canceler training process does not assume that the digital impairment sources always map one PCM level to another PCM level.

Another advantage is that a server modem echo canceler training technique according to the present invention is more robust and reliable than prior art techniques.

Another advantage is that the present invention provides a server modem echo canceler training scheme having less exposure to system noise than previous solutions.

The above and other advantages of the present invention may be carried out in one form by a method for training and adaptive updating of a server modem echo canceler in a data communication system having a transmitter configured to transmit signals over a downstream communication channel and a receiver configured to receive signals over an upstream communication channel. where echo signals follow an analog echo path from the transmitter to the receiver. The preferred method involves transmitting a training signal from the transmitter, determining, in response to the training signal, digital impairments present within the echo path, and obtaining, in response to the training signal, the transfer characteristics of the echo path.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION OF PREFERRED EXEMPLARY EMBODIMENTS

The present invention may be described herein in terms of functional block components and various processing steps. It should be appreciated that such functional blocks may be realized by any number of hardware components configured to perform the specified functions. For example, the present invention may employ various integrated circuit components, e.g., memory elements, digital signal processing elements, look-up tables, and the like, which may carry out a variety of functions under the control of one or more microprocessors or other control devices. In addition. those skilled in the art will appreciate that the present invention may be practiced in any number of data communication contexts and that the modem system described herein is merely one exemplary application for the invention. Further, it should be noted that the present invention may employ any number of conventional techniques for data transmission, control signaling, signal processing and conditioning, and the like. Such general techniques are known to those skilled in the art and will not be described in detail herein.

Figure 1:
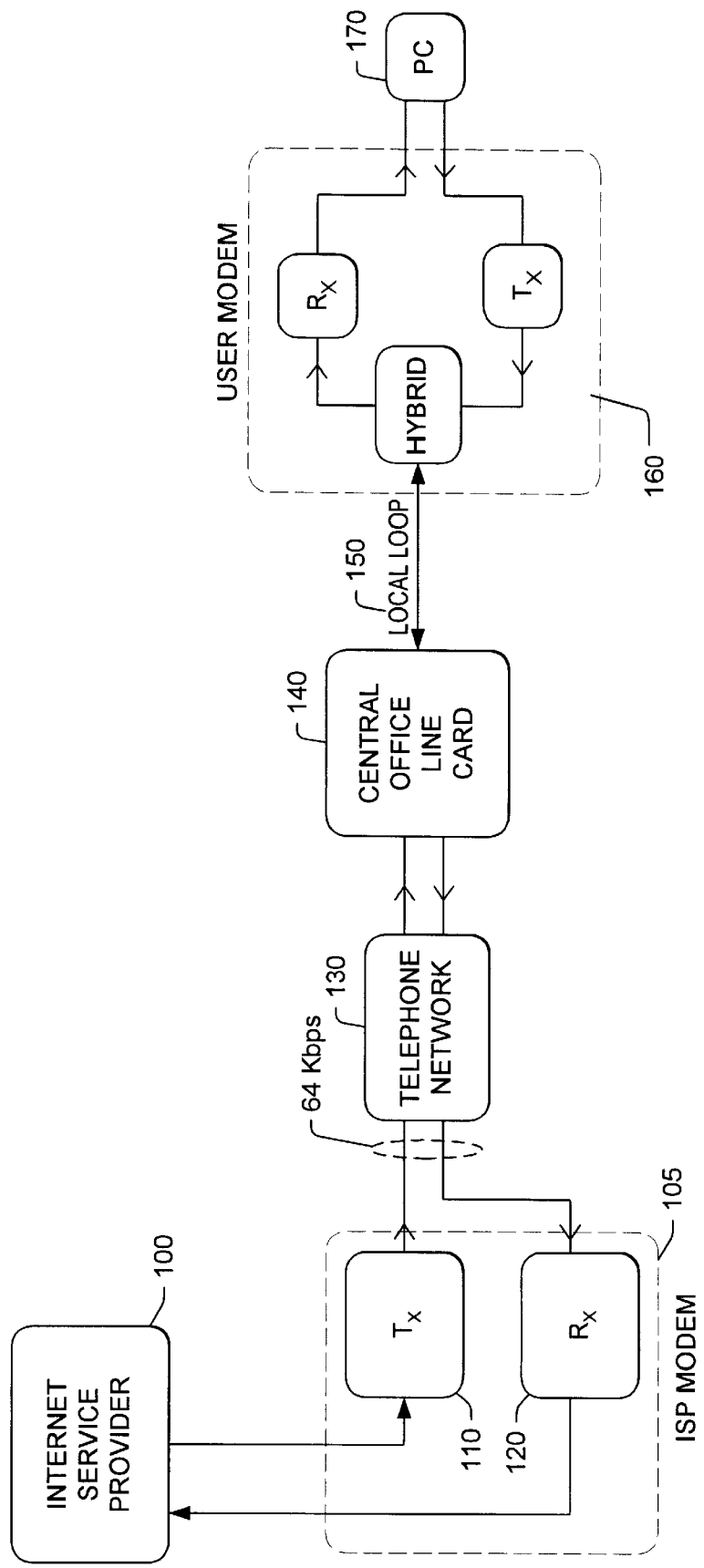
FIG. 1 is a schematic representation of an exemplary PCM modem system in which the principles of the present invention may be incorporated.
Figure 2:
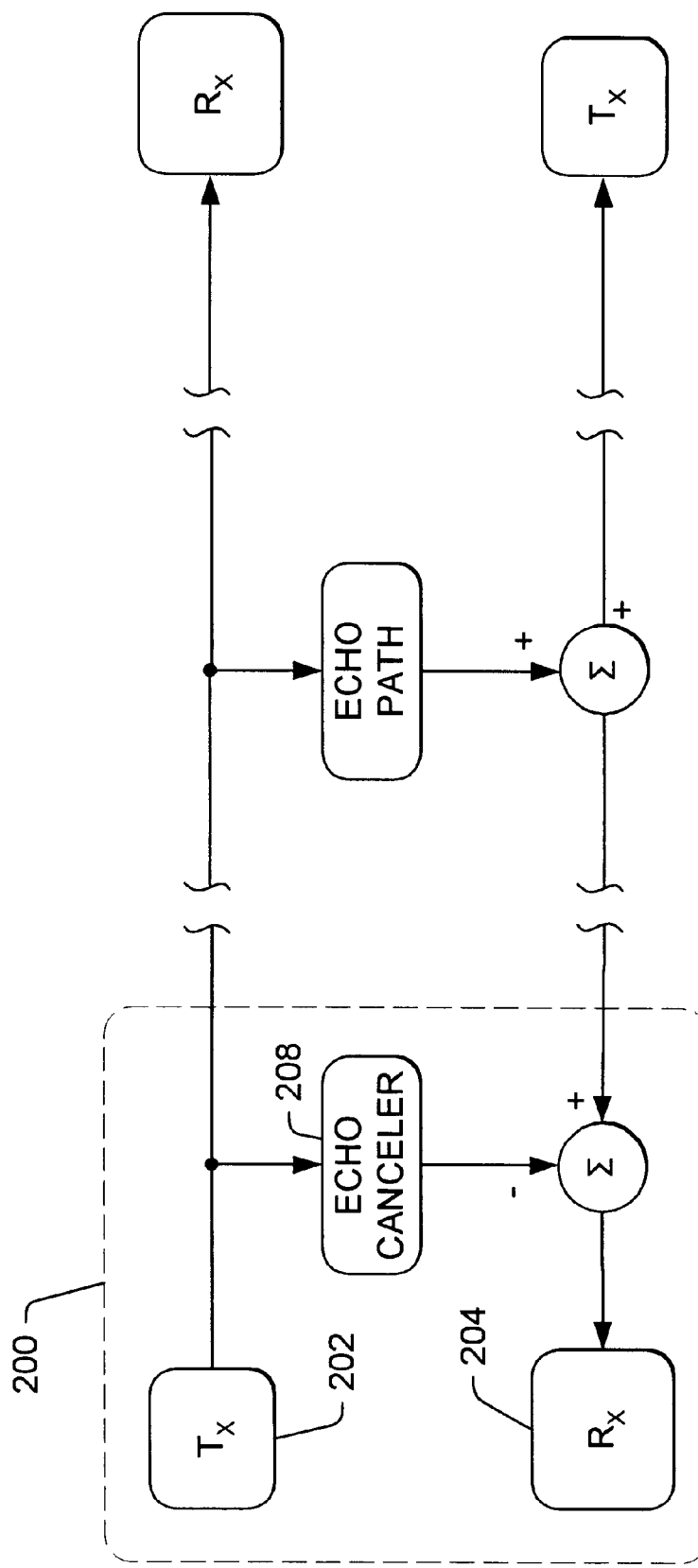
FIG. 2 is a schematic representation of an exemplary modem system having an echo canceler that compensates for near-end echo signals.
Figure 3:
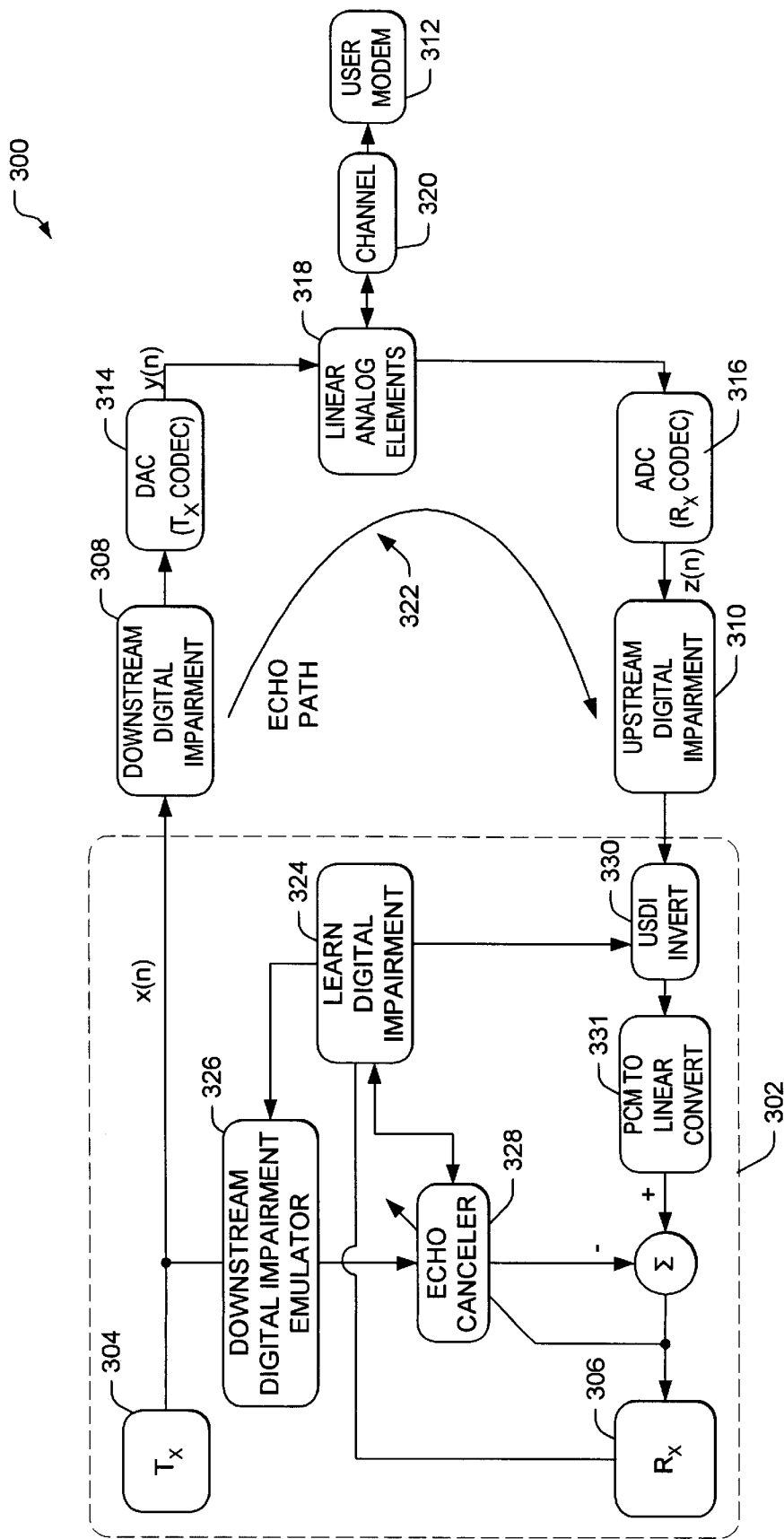
FIG. 3 is a detailed schematic representation of an exemplary PCM modem system having a server modem configured in accordance with the present invention.

An exemplary PCM modem system 100 that may incorporate the principles of the present invention is generally shown in FIG. 1, and FIG. 3 is a more detailed block diagram depiction of a PCM modem system 300 configured in accordance with the present invention. It should be appreciated that the particular implementation shown in FIG. 3 and described herein is merely exemplary and is not intended to limit the scope of the present invention in any way. Indeed, for the sake of brevity, conventional timing recovery, automatic gain control (AGC), synchronization, training, and other functional aspects of modem system 300 are not described in detail herein. Furthermore. the connecting lines shown in FIG. 3 are intended to represent exemplary functional relationships and/or physical couplings between the various elements. Those skilled in the art will recognize that many alternative or additional functional relationships or physical connections may be present in a practical modem system.

FIG. 3 illustrates a portion of a server modem 302, which includes a transmitter 304 and a receiver 306. A number of downstream digital impairments (DSDI) 308 may be present in the downstream channel. The DSDI 308 may include one or more of the following components: robbed-bit signaling (RBS) prior to a digital pad. a digital pad, and RBS after a digital pad. These digital impairments can affect the signals that are originally transmitted by transmitter 304. For analytical purposes, DSDI 308 is assumed to define a memoryless transfer function. In other words, the transfer function is independent of any past values. In fact, the combination of DSDI 308 and a digital to analog converter 314 can be adequately modeled by a memoryless mapping function. Upstream digital impairments (USDI) 310 may also be present in the upstream channel. However, the presence of digital pads in the upstream direction are rarely encountered. Accordingly, to simplify the following discussion and the corresponding inventive concepts, the USDI 310 is assumed to only include RBS.

Due to the presence of DSDI 308, V.90 modem systems perform a digital line impairment learning procedure to enable the analog PCM modem, e.g., a user modem 312, to design appropriate signal point constellations for use during the data mode. One suitable digital line impairment learning procedure is set forth in the draft V.90 recommendation published by the ITU Telecommunications Standardization Sector; the entire content of the V.90 recommendation is hereby incorporated by reference. In addition, a suitable digital line impairment learning procedure is described in U.S. patent application Ser. No. 08/969,971, filed Nov. 13, 1997. The entire content of this patent application is also hereby incorporated by reference. Briefly, the characteristics of DSDI 308 are learned and established by transmitting a suitably formatted signal from server modem 302 to user modem 312. User modem 312 then analyzes the received learning signal to determine the characteristics of the DSDI 308. User modem 312 may then design an appropriate set of signal point constellations in response to the characteristics of the DSDI 308; the constellations are designed to compensate for the DSDI 308.

Server modem 200 also operates in conjunction with a digital-to-analog converter (DAC) 314 (typically associated with the transmit codec, which, in a practical telecommunication system. may be located at a central office line card) and an analog-to-digital converter (ADC) 316 (typically associated with the receive codec, which, in a practical telecommunication system, may be located at a central office line card). A number of linear analog elements 318, e.g., a hybrid and any number of analog filters, may also be associated with modem system 300. Hybrids, which are generally well known, provide an interface between the telephone network communication channel 320 and user modem 312. Those skilled in the art will be familiar with the characteristics and operation of these components, which may utilize techniques and processes known in the data communications art.

A server modem echo path 322 is also depicted in FIG. 3. In the context of exemplary modem system 300, the transfer function of echo path 322 may include contributions from DSDI 308, DAC 314, linear analog elements 318. ADC 316. USDI 310, and other elements (not shown) present in modem system 300. Accordingly, echo path 322 may include contributions from linear and/or nonlinear sources. For example, a traditional analog linear echo path includes contributions from DAC 314, linear analog elements 318, and ADC 316 (although there may be nonlinear distortion effects caused by one or more of these components). On the other hand, the effects of DSDI 308 and USDI 310 are nonlinear in nature. These nonlinearities must be contemplated to provide optimum echo cancellation. Accordingly, the present invention preferably models echo path 322 as a combination of a nonlinear memoryless mapping, an LTI filter, and another nonlinear memoryless mapping.

Server modem 302 may include a digital impairment learning element 324 configured to establish digital impairment information associated with DSDI 308 and/or USDI 310. It should be noted that a practical implementation may incorporate learning element 324 into echo canceler 328 and/or into any number of echo cancellation elements (described below). With respect to DSDI 308, server modem 302 need not rely upon user modern 312 to provide information or data associated with DSDI 308. Accordingly, unlike prior art techniques, server modem 302 can detect and analyze the effects of DSDI 308 in a robust and reliable manner without having to rely upon the performance or precision of user modem 312. In addition, server modem 302 need not assume that the digital impairments map one PCM level to another PCM level (which may not necessarily be a valid assumption), the server modem echo cancellation techniques of the present invention can be employed to more accurately model echo path 322. Furthermore, the independent determination of the digital impairments by server modem 302 is desirable because the contributions of upstream components and processing elements are also considered.

Learning element 324 may establish the effects of DSDI 308 by carrying out any suitable process. For example, learning clement 324 may utilize the same (or similar) techniques that are employed by user modem 312 during its conventional detection of DSDI 308. For example, all possible output symbols for each of the various RBS phases can be analyzed to enable a DSDI emulator 326 to provide a suitable input to an echo canceler 328. It should be appreciated that more efficient techniques may also be implemented. For example, the RBS pattern may be initially determined to enable modem 302 to subsequently determine the digital pad information by comparing received values corresponding to the presence and absence of RBS. Alternatively, a number of separate echo cancelers (each associated with a particular symbol position) may be trained with shortened impulse responses in parallel with echo canceler 328. Then, by comparing the errors from each of the individual echo cancelers, the presence of downstream RBS can be detected and analyzed. It follows that the digital pad information may be extracted by correlating the residual echo with the position of the transmitted symbols in the echo canceler delay line.

Echo canceler 328 may be realized by any number of conventional structures. In one exemplary embodiment, echo canceler 328 is configured as an adaptive digital filter that employs a least-mean-square (LMS) algorithm. Exemplary LMS filters, and other suitable arrangements are described in detail in ADAPTIVE FILTER THEORY, by Simon Haykin (3rd ed., 1996), which is incorporated by reference herein.

In the preferred embodiment of the present invention, and as mentioned above, USDI 310 is assumed to only include RBS. This type of RBS is deterministic and is relatively easy to detect and analyze while receiving any signal of sufficient amplitude during, e.g., an upstream line probing procedure. In a practical embodiment, a signal of sufficient amplitude is necessary such that server modem 302 can detect the occurrence of the upstream RBS (RBS affects the least significant bits of the tainted symbols; the amplitude of the received signal must be such that a "switching" of the least significant bits can be detected). The signal used to determine the upstream RBS may originate from user modem 312, from server modem 302. or from any suitable source. The presence of RBS can be detected by server modem 302 by monitoring the least significant bits of periodically received symbols, regardless of the source of such symbols. USDI 310 is easier to process than DSDI 308 because, unlike the downstream signals received by user modem 312, channel distortion and noise components have no effect on the RBS-tainted signal received by server modem 302.

It should be appreciated that the determination of DSDI 308 may be performed at any suitable time. For example, DSDI 308 may be determined concurrently with the echo canceler training. However, in the preferred embodiment, DSDI 308 is analyzed prior to the echo canceler training.

One suitable upstream line probing technique is set forth in the V.34 recommendation (this upstream line probing technique is conducted during Phase 2 training). Accordingly, in the context of the present invention, it is assumed that USDI 310 can be accurately determined, e.g., by learning element 324, and compensated for. For example, an exemplary server modem 302 may monitor the robbed bit positions (e.g., the least significant bits) of received symbols over a predetermined symbol frame. In practice, RBS caused by the upstream channel will be repeated at server modem 302 every 12 or 24 symbols (i.e., the RBS pattern will be two or four bits), and possibly every 6 symbols. If RBS is present in a particular symbol phase, every sixth least significant bit will be robbed and repeated every 24 symbols. During Phase 2 training of a V.90 server modem, the probability of every 24th bit being constant absent RBS is very low. Accordingly, if a given symbol position within a 24-symbol frame is consistently received as the same value throughout Phase 2, then server modem 302 can assume that RBS has affected that particular symbol position.

Server modem 302 may include a USDI inverter 330 configured to "reverse" the effects of USDI 310. USDI inverter 330 may be configured to suitably process the incoming signal to compensate for the presence of upstream RBS by translating $\mu$-law symbols transmitted at the RBS-affected positions within a frame to a linear value that minimizes the affect of the upstream RBS.

The various echo cancellation elements, e.g., echo canceler 328, DSDI emulator 326, and USDI inverter 330 are preferably trained during an initialization period near the beginning of a communication session. Accordingly, an echo cancellation training signal may be generated by transmitter 304 such that digital impairment learning element 324 can apply the appropriate process control parameters to the relevant echo cancellation elements. In the preferred embodiment. server modem 302 takes advantage of the digital impairment learning (DIL) signal that is already called for in the V.90 recommendation.

As described above, the DIL signal is configured to enable user modem 312 to determine DSDI 308 in the downstream channel. The V.90 recommendation requires that a two-point (one training symbol and one reference symbol, with positive and negative signs) DIL signal be transmitted from server modem 302 to user modem 312 during Phase 3 training. The present inventors have determined that server modem 302 can utilize the same DIL signal to concurrently train echo canceler 328 and/or DSDI emulator 326 in response to the digital impairment characteristics of echo path 322. The use of the DIL signal in the context of echo cancellation reduces the processing complexity of server modem 302. Of course, the training of the echo cancellation elements of server modem 302 can alternatively be accomplished by transmitting a dedicated training signal from transmitter 304.

As described above, the contribution of USDI 310 is preferably determined during the Phase 2 training. In the preferred exemplary embodiment, the linear analog echo portion of echo path 322 is then determined during the two-point Phase 3 training procedure. Thereafter, e.g., during the digital line impairment learning procedure, the portion of the echo path 322 associated with DSDI 308 (and/or other nonlinear memoryless functions) is established by server modem 302.

After transmission by transmitter 304, the echo cancellation training signal may be subjected to DSDI 308, which may include initial RBS (i.e., prior to a digital pad), a digital pad, and/or subsequent RBS (i.e., after a digital pad). Accordingly, the signal following DSDI 308 may be impaired in a nonlinear manner by DSI 308. The digitally impaired echo cancellation training signal is then processed by DAC 314 in the same manner as any other transmitted signal. A portion of the converted echo cancellation training signal (i.e., the echo portion) appears at the input to ADC 316; the echo effect is caused by the combination of linear analog elements 318 and transmission channel 320. The determination and modeling of the echo characteristics of linear analog components is well known (assuming the input to such linear analog components is known), such modeling techniques will not be described herein. ADC 316 processes the echo signal in the same manner as any other received signal.

After being converted by ADC 316, the echo signal may be affected by USDI 310, which rarely includes anything other than RBS. Thus as described above USDI 310 can be determined and compensated for in a relatively straightforward manner it server modem 302 assumes that USDI 310 only includes RBS. The nonlinear contributions of DSDI 308 and USDI 310, in addition to nonlinear distortion effects present in the analog echo path, make it challenging to efficiently and reliably establish echo path 322 using conventional techniques.

Regardless of the specific configuration and format of the initial echo cancellation training signal, the corresponding echo signal is eventually received by receiver 306 and suitably analyzed by digital impairment learning element 324. Digital impairment learning element 324 may then employ any number of suitable algorithms to generate appropriate correction parameters for echo canceler 328, DSDI emulator 326, and/or USDI inverter 330. Depending upon the specific implementation, the functionality of DSDI emulator 326 and/or USDI inverter 330 may be incorporated into echo canceler 328. With such an arrangement, digital impairment learning element 324 may be suitably configured to train one echo canceler architecture rather than a number of individual processing components.

Sever modem 302 may include a PCM code to linear converter element 331. Element 331 preferably converts each of the 8-bit PCM codes (PCM codes are nonlinear in nature) into a corresponding 14-bit linear code. Accordingly, the combination of converter element 331, USDI inverter 330, USDI 310, and ADC 316 may be considered to function like a linear codec. In other words, the signal input to ADC 316 exhibits linear characteristics and the signal output from converter element 331 also exhibits linear characteristics.

As described above, the preferred embodiment leverages the DIL signal that is already specified in the V.90 recommendation for use after the two-point Phase 3 training procedure; the current start-up routine need not be modified to accommodate the improved echo cancellation training. Furthermore, the preferred echo cancellation training procedure does not rely on any information that is determined or transmitted by user modem 312. Although a number of specific echo canceler training methodologies may be suitable in the context of the present invention, the following exemplary algorithm takes advantage of the two-point training procedure in Phase 3 and the nature of the V.90 DIL signal.

There are many different ways to establish such a training procedure. It may be possible to classify the different approaches into two main categories: one methodology explicitly identifies a potentially scaled version of the analog portion of the linear echo impulse response and the other methodology implicitly identifies the same. In this description, an exemplary algorithm from the latter category is set forth.

Referring to FIG. 3. the sequence of symbols transmitted by server modem 302 is assumed to be x(n), e.g., a sequence of the 8-bit universal codes set forth in the V.90 recommendation. In the context of this description, n is used to indicate the time index of x(n) and other symbol sequences, the symbols are transmitted in accordance with a certain pre-established data rate. After the occurrence DSDI 308 and DAC 314, the sequence x(n) is mapped to the sequence y(n), where $y(n)=F_n[x(n)]$. The subscript n is employed to indicate the dependency of the function F over the time index n. In a practical system, it can be assumed that $F_n[.]$ is odd symmetric with a certain period, i.e., $F_n[-x(n)]=-F_n[x(n)]$. In the exemplary V.90 environment it can be assumed that $F_n[.]$ has a period of six, i.e., there are only six possible values of y(n) for each value of x(n), depending upon the RBS phases. This assumption arises from the realization that, for a given communication session, RBS will affect transmitted symbols in a periodic nature (a period of six symbols).

If the substantially linear time invariant echo channel response (associated with linear analog elements 318) is defined as h(n) then the echo signal present prior to ADC 316 can be written as:

$$z(n) = \sum_{k=0}^{M-1} h(k)y(n-k) + q(n) = \sum_{k=0}^{M-1} h(k)F_{n-k}[x(n-k)] + q(n),$$

where q(n) is the quantization noise introduced by ADC 316. In the context of this description, M is the sample length of h(n), which is modeled as an impulse response of the linear analog echo path. In a practical V.90 modem system. M may exceed 100 samples. By defining $G_{n-k}[x(n-k)]=h(k)F_{n-k}[x(n-k)]$, the above equation can be rewritten as:

$$z(n) = \sum_{k=0}^{M-1} h(k)F_{n-k}[x(n-k)] + q(n) = \sum_{k=0}^{M-1} G_{n-k}[x(n-k)],$$

where $G_{n-k}[x(n-k)]$ represents the amount of echo at time index n created by sending a value x(n−k) at time index n−k, which is both a nonlinear function of the possible values of x(n−k) and the time index n−k. In the preferred exemplary V.90 system, x(n) has 256 possible values, $G_{n-k}[.]$ has six possible forms, and the length of the echo path is M. It is theoretically correct to form a table of synthesized echo values, $\hat{G}_{n-k}[x(n-k)]$, to emulate all of the possible values of z(n). Therefore, the echo can be modeled by an appropriate sum of $G_{n-k}$ values, which are dependent upon the respective values of x(n−k). Consequently, the size of the table will be 256*M*6 data points or entries.

Considering the above assumptions and relationships, the adaptive algorithm for updating each of the $\hat{G}_{n-k}$ values is as follows:

$$e(n) = z(n) - \sum_{k=0}^{M-1} \hat{G}_{n-k}^{(n)}[x(n-k)];$$

and $$\hat{G}_{n-k}^{(n+1)}[x(n-k)] = \hat{G}_{n-k}^{(n)}[x(n-k)] + \mu e(n).$$

It should be noted that this technique concurrently determines the echo characteristics of linear analog elements 318, along with the echo characteristics of the nonlinear elements, e.g., DSDI 308. Although this is a very general and powerful approach that is applicable to any function $G_{n-k}$, and one that only utilizes additive operations, an excessive amount of memory may be required to implement the algorithm in a practical system. In addition, this algorithm converges in a relatively slow fashion. Accordingly, a more memory efficient procedure may be utilized to provide better results. The preferred procedure defines one of the echo cancellation training symbols to be a reference value and determines suitable scaling adjustments to compensate for the digital impairments. In the exemplary V.90 modem system, preferred reference points are already defined during the Phase 3 two-point training procedure. This alternate technique may be considered to be a two-step process. where the linear analog echo components and the nonlinear digital echo components are determined separately.

As described above, a reference value $x_{ref}(n)$ is selected to start the initial training of echo canceler 328. This step only utilizes 6*M of memory because only one x(n) value is used, i.e., the reference value. In this context, the algorithm is as follows:

$$e(n) = z(n) - \sum_{k=0}^{M-1} \hat{G}_{n-k}^{(n)}[x_{ref}(n-k)]; \quad \text{and}$$

$$\hat{G}_{n-k}^{(n+1)}[x_{ref}(n-k)] = \hat{G}_{n-k}^{(n)}[x_{ref}(n-k)] + \mu e(n).$$

This expression is equivalent to the above expression but for the use of $x_{ref}(n-k)$ rather than x(n−k). For any new value of x(n) such that $x(n) \neq x_{ref}(n)$, the function F can be redefined as:

$$F_n[x(n)] = s_n[x(n)]F_n[x_{ref}(n)],$$

where $s_n$ is a scaling factor. It follows that:

$$G_{n-k}[x(n-k)] = h(k)F_{n-k}[x(n-k)] = h(k)s_{n-k}[x(n-k)]F_{n-k}[x_{ref}(n-k)] = s_{n-k}[x(n-k)]G_{n-k}[x_{ref}(n-k)].$$

In the exemplary embodiment described herein, $s_n[x(n)]$ can have a maximum of six different values for each new value of x(n); the particular value depends upon the RBS phase. Thus, the algorithm need only determine 6*256, or 1536 of the $s_n[x(n)]$ values to fully characterize all of the possible synthesized echo values. In addition, the $s_n[x(n)]$ values define or characterize the mapping associated with DSDI 300. The preferred adaptive algorithm is expressed as:

$$e(n) = z(n) - \sum_{k=0}^{M-1} s_{n-k}[x(n-k)]\hat{G}_{n-k}^{(n)}[x_{ref}(n-k)];$$

and $$s_{n-k}^{(n+1)}[x(n-k)] = s_{n-k}^{(n)}[x(n-k)] + \mu e(n)G_{n-k}[x_{ref}(n-k)].$$

If it is assumed that $G_{n-k}[.]$ is odd symmetric, then the amount of memory required to support the algorithm can be further reduced to 6*128, which is comparable to the amount of memory required to perform adaptive level estimation by user modem 312 during initialization.

In summary, the present invention provides an improved echo cancellation technique suitable for V.90 server modems; the technique is more robust and reliable than prior art methods. The present invention also provides an echo canceler training technique that is dedicated to the server modem; the training technique need not rely upon information sent from the client modem to the server modem. The preferred echo canceler training procedure utilizes a line probing signal which also serves as a downstream digital impairment learning signal for the modem system. In accordance with the present invention, the server modem may be configured to compensate for digital impairments and other nonlinear distortions that may be present in the near-end echo path. Unlike prior art methodologies, the preferred echo canceler training process does not assume that the digital impairment sources always map one PCM level to another PCM level. Furthermore, the echo canceler training scheme has less exposure to system noise than previous solutions.

The present invention has been described above with reference to a preferred embodiment. However, those skilled in the art will recognize that changes and modifications may be made to the preferred embodiment without departing from the scope of the present invention. These and other changes or modifications are intended to be included within the scope of the present invention, as expressed in the following claims.

What is claimed is:

1. An echo cancellation method for a modem system comprising a first modem having an echo canceler, a transmitter configured to transmit signals to a second modem over a downstream communication channel and a receiver configured to receive signals from said second modem over an upstream communication channel, where an echo channel conveys echo signals between said transmitter and said receiver, said method comprising the steps of:

transmitting a training signal;

receiving a training echo signal, said training echo signal being associated with said training signal; and determining, in response to said training echo signal, one or more digital impairments associated with said communication channel;

generating one or more parameters based on said one or more digital impairments; and configuring said echo canceler according to said one or more parameters.

2. The echo cancellation method of claim 1, wherein said training signal being formatted to enable said second modem to establish characteristics of said downstream channel in response to said training signal.

3. The echo cancellation method of claim 1, wherein said one or more digital impairments are caused by a robbed-bit signaling in said downstream channel.

4. The echo cancellation method of claim 1, wherein said one or more digital impairments are caused by a digital pad in said downstream channel.

5. The echo cancellation method of claim 1, wherein said one or more digital impairments are caused by a robbed-bit signaling prior to a digital pad, said digital pad and a robbed-bit signaling after said digital pad in said downstream channel.

6. The training method of claim 1, wherein said one or more digital impairments are caused by a robbed-bit signaling in said upstream channel.

7. A training method for use by a first modem having an echo canceler, said first modem being in communication with a second modem over a communication channel, said method comprising:

transmitting a digital impairment learning signal, wherein said digital impairment learning signal is capable of being used by said second modem to design a set of signal point constellations;

receiving an echo signal, said echo signal being associated with said digital impairment learning signal;

analyzing said echo signal to determine one or more digital impairments of said communication channel; and configuring said echo canceler according to said one or more digital impairments of said communication channel.

8. The training method of claim 7, wherein said communication channel includes a downstream channel and an upstream channel.

9. The training method of claim 8, wherein said one or more digital impairments are caused by a robbed-bit signaling in said downstream channel.

10. The training method of claim 8, wherein said one or more digital impairments are caused by a digital pad in said downstream channel.

11. The training method of claim 8, wherein said one or more digital impairments are caused by a robbed-bit signaling prior to a digital pad, said digital pad and a robbed-bit signaling after said digital pad in said downstream channel.

12. The training method of claim 8, wherein said one or more digital impairments are caused by a robbed-bit signaling in said upstream channel.

13. A first modem device in communication with a second modem over a communication channel, said first modem device comprising:

a transmitter capable of transmitting a digital impairment learning signal, wherein said digital impairment learning signal is capable of being used by said second modem to design a set of signal point constellations;

a receiver;

a learning element; and an echo canceler;

wherein said transmitter transmits said digital impairment learning signal to said second modem device, and said receiver receives an echo signal, said echo signal being associated with said digital impairment learning signal, and wherein said learning element receives said echo signal from said receiver, determines one or more digital impairments of said communication channel and configures said echo canceler according to said one or more digital impairments of said communication channel.

14. The first modem device of claim 13 further comprising a digital impairment emulator, wherein said digital impairment emulator receives one or more parameters based on said one or more digital impairments from said learning element and said digital impairment emulator provides an input to said echo canceler.

15. The first modem device of claim 13 further comprising an inverter configured to process said echo signal to compensate for the presence of a robbed-bit signaling.

16. The first modem device of claim 13 further comprising a linear converter element, wherein said linear converter element converts each 8-bit PCM code into a corresponding 14-bit linear code.

17. A communication device for communication with a remote device over a communication channel having a downstream communication channel and an upstream communication channel, said communication device comprising:

a transmitter capable of transmitting a training signal;

a receiver capable of receiving a training echo signal, said training echo signal being associated with said training signal; and a learning element capable of determining, in response to said training echo signal, one or more digital impairments associated with said communication channel;

an echo canceler;

wherein said learning element configures said echo canceler according to said one or more digital impairments of said communication channel.

18. The communication device of claim 17 further comprising a digital impairment emulator, wherein said digital impairment emulator receives one or more parameters based on said one or more digital impairments from said learning element and said digital impairment emulator provides an input to said echo canceler.

19. The first modem device of claim 17 further comprising an inverter configured to process said echo signal to compensate for the presence of a robbed-bit signaling.

20. The first modem device of claim 17 further comprising a linear converter element, wherein said linear converter element converts each 8-bit PCM code into a corresponding 14-bit linear code.

* * * * *